US008345250B1

(12) United States Patent
Janosky et al.

(10) Patent No.: US 8,345,250 B1
(45) Date of Patent: Jan. 1, 2013

(54) SYSTEM AND METHOD FOR DETECTING CHEMICAL SPECIES FROM A REMOTE SENSING PLATFORM

(75) Inventors: Mark Steven Janosky, Rochester, NY (US); Joseph Lawrence Lippert, Rochester, NY (US)

(73) Assignee: Exelis, Inc., McLean, VA (US)

( * ) Notice: Subject to any disclaimer, the term of this patent is extended or adjusted under 35 U.S.C. 154(b) by 532 days.

(21) Appl. No.: 12/610,443

(22) Filed: Nov. 2, 2009

(51) Int. Cl.
*G01N 21/00* (2006.01)

(52) U.S. Cl. ...................................... 356/437; 250/338.5

(58) Field of Classification Search .......................... None
See application file for complete search history.

(56) References Cited

U.S. PATENT DOCUMENTS

| | | | |
|---|---|---|---|
| 3,032,655 A | 5/1962 | Gleason Romans | |
| 4,001,764 A | 1/1977 | Holland et al. | |
| 4,450,356 A | 5/1984 | Murray et al. | |
| 4,489,239 A | 12/1984 | Grant et al. | |
| 4,555,627 A | 11/1985 | McRae, Jr. | |
| 4,853,543 A | 8/1989 | Ozdemir | |
| 4,870,275 A | 9/1989 | Ozdemir et al. | |
| 4,871,916 A | 10/1989 | Scott | |
| 5,166,789 A | 11/1992 | Myrick | |
| 5,250,810 A | 10/1993 | Geiger | |
| 5,294,796 A | 3/1994 | Fee | |
| 5,298,751 A | 3/1994 | Fee et al. | |
| 5,410,154 A | 4/1995 | Broicher et al. | |
| 5,430,293 A | 7/1995 | Sato et al. | |
| 5,481,476 A | 1/1996 | Windig | |
| 5,742,053 A | 4/1998 | Rekunyk | |
| 5,818,951 A | 10/1998 | Schivley | |
| 6,366,681 B1 | 4/2002 | Hutchins | |
| 6,484,564 B1 | 11/2002 | Hayashida | |
| 6,509,566 B1 | 1/2003 | Wamsley et al. | |
| 6,674,522 B2 | 1/2004 | Krantz et al. | |
| 6,725,705 B1 | 4/2004 | Huelber et al. | |
| 6,822,742 B1 | 11/2004 | Kayleyeh et al. | |
| 6,864,983 B2 | 3/2005 | Galle et al. | |
| 6,995,846 B2 | 2/2006 | Kalayeh et al. | |

(Continued)

FOREIGN PATENT DOCUMENTS

EP       0 489 546 A2    6/1992

(Continued)

OTHER PUBLICATIONS

Werner Zirnig et. al., "Innovative Technologies Improve Environmental Protection—Detection of Gas Leaks by Helicopter—Borne Infrared Laser System", pp. 1-7.

(Continued)

*Primary Examiner* — Gordon Stock, Jr.
(74) *Attorney, Agent, or Firm* — RatnerPrestia

(57) ABSTRACT

A remote sensing system includes a transmitter for transmitting an online signal and first and second offline signals toward a target. A receiver receives a returned online signal and first and second returned offline signals from the target. A processor is provided for determining (a) a first ratio based on the returned online signal and first offline signal, and (b) a second ratio based on the returned online signal and second offline signal. A filter is also provided for correlating the first ratio with the second ratio for determining whether the returned online, first offline and/or second offline signals are useable. The returned online, first offline and second offline signals are used to compute first and second concentration path lengths (CPLs) of a column of air between a target and the remote sensing platform.

13 Claims, 6 Drawing Sheets

U.S. PATENT DOCUMENTS

| | | | |
|---|---|---|---|
| 2003/0030001 A1 | 2/2003 | Cooper | |
| 2004/0011948 A1 | 1/2004 | Tobiason | |
| 2004/0088113 A1 | 5/2004 | Spoonhower et al. | |
| 2004/0263852 A1 | 12/2004 | Degtiarev et al. | |
| 2006/0268947 A1* | 11/2006 | Kalayeh | 372/20 |
| 2007/0002306 A1* | 1/2007 | Kalayeh | 356/4.07 |
| 2007/0061114 A1* | 3/2007 | Kalayeh | 702/191 |

FOREIGN PATENT DOCUMENTS

| | | |
|---|---|---|
| WO | WO 02/27297 A1 | 4/2002 |

OTHER PUBLICATIONS

Egor V. Degtiaryev et.al., "Compact mid-infrared DIAL lidar for ground-based and airborne pipeline monitoring", SPIE, vol. 4882, 2003, pp. 432-441.

S. Brunsgaard et. al., High-Pressure Measuring Cell for Raman Spectroscopic Studies of Natural Gas, Applied Spectroscopy, vol. 55, No. 1, 2001, pp. 55-60.

E.P. Mackerrow et. al., "Effect of speckle on lidar pulse-pair ration statistics", Applied Optics, vol. 36, No. 33, Nov. 20, 1997, pp. 8650-8669.

Peters, III, R.A. ; Nichols, James A. "Rocket Plume Image Sequence Enhancement Using 3D Operators", IEEE Transactions of Aerospace and Electronic Systems, vol. 33, No. 2, Apr. 1997, pp. 485-498.

Minren, Deng; Gongsen, Wang; Jian, Tang, (Beijing Institute of Radio Measurement and Metrology) "The Antennas for the Propulsion Plume Attenuation Test", IEEE, 2004, pp. 78-81.

Hardesty, R.M.; Seniff, C.J.; Banta, R.M.; Brewer, W.A.; Alvarez II, R.J.; Darby, L.S.; Marchbanks, R.D., Lidar Applications in Regional Air Quality Studies, IEEE 2001, pp. 1029-1031.

International Search Report of Application No. PCT/US2004/042485, dated Apr. 29, 2005.

International Search Report of Application No. PCT/US2006/032106, dated Dec. 15, 2006.

International Search Report of Application No. PCT/US2006/019945, dated Dec. 13, 2007.

Office Action of U.S. Appl. No. 11/223,241, USPTO, Oct. 24, 2006.

Office Action of U.S. Appl. No. 11/223,241, USPTO, Feb. 20, 2007.

Office Action of U.S. Appl. No. 11/135,768, USPTO, Oct. 2, 2007.

Office Action of U.S. Appl. No. 11/135,768, USPTO, Mar. 26, 2008.

Office Action of U.S. Appl. No. 11/135,768, USPTO, May 20, 2008.

Office Action of U.S. Appl. No. 11/135,768, USPTO, Jun. 25, 2008.

Office Action of U.S. Appl. No. 10/959,363, UPTO, Jun. 6, 2005.

First Office Action of Chinese Appln. No. 2004800418746, dated Feb. 6, 2009 and English translation.

Second Office Action of Chinese Appln. No. 2004800418746, dated Sep. 11, 2009 and English translation.

Office Action of European Appl. No. 04814638.5-2204, dated Jan. 15, 2008.

Office Action of Russian Appl. No. 2006126063, dated Sep. 22, 2008 and English Translation.

* cited by examiner

SYSTEM AND METHOD FOR DETECTING CHEMICAL SPECIES FROM A REMOTE SENSING PLATFORM

FIELD OF THE INVENTION

The present invention relates, in general, to detecting chemical species from a remote platform. More specifically, the present invention relates to systems and methods for detecting chemical species from a remote platform using a differential absorption lidar (DIAL) technique.

BACKGROUND OF THE INVENTION

Remote sensing of chemical species below, on top and above the ground, or water is becoming increasingly important for security, conservation and monitoring by both government and private industry. Numerous detection techniques including laser based differential absorption lidar (DIAL) have been used. Each technique is subject to real world noise factors. Even in a differential technique, such as DIAL, which is designed to reduce noise factors, factors such as atmospheric interference, irregular surface reflectance, object interference (bushes, trees, power line, etc.), source laser misalignment, source laser energy distribution and relative motion between the remote sensing platform and the target may lead to poor data quality. This poor data quality, in turn, may lead to missed detection or false positive detection.

For most DIAL techniques, conventional systems use two lasers (or one laser that produces two wavelengths) in which one laser is designated the online laser and the other laser is designated the offline laser. The online laser signal is designed to be absorbed by the chemical species of interest, while the offline laser signal is designed not to be absorbed by the chemical species of interest. By measuring the transmitted and returned energies for both lasers and applying a differential data processing technique, one may measure the path-integrated concentration, or concentration path-length product (also referred to as the concentration path length (CPL)) of the chemical species in the column of air to a particular target location. This differential measurement helps reduce noise factors but the measurement may further be refined by allowing a longer sample exposure or by integrating samples of the same column of air. However, this tends to defeat one of the advantages of a remote sensing system which is rapid area coverage.

The present invention provides a system and method for improving the quality of detection of a chemical species using a DIAL-type of remote sensing system. As will be explained, the system and method uses three or more laser sources and produces at least two CPL samples for a given target location. In addition, the system and method of the present invention uses a correlation technique to obtain improved quality control of the detection process and, simultaneously, permits completion of area survey work in a rapid manner, without missing a detection or reporting a false detection.

SUMMARY OF THE INVENTION

To meet this and other needs, and in view of its purposes, the present invention provides a remote sensing system including a transmitter for transmitting an online signal and first and second offline signals toward a target; and a receiver for receiving a returned online signal and first and second returned offline signals from the target. A processor determines (a) a first ratio based on the returned online signal and first offline signal, and (b) a second ratio based on the returned online signal and second offline signal. A filter correlates the first ratio with the second ratio for determining whether the returned online, first offline and second offline signals are useable. The returned online, first offline and second offline signals includes concentration path lengths (CPLs) in a column of air between a target and the remote sensing system. The first and second ratios, respectively, include a first ratio between the returned online signal and the returned first offline signal forming a first CPL, and a second ratio between the returned online signal and the returned second offline signal forming a second CPL.

The processor is configured to determine integrated values of first CPLs and second CPLs, based on a predetermined number of received returned online, first offline and second offline signals. The filter is configured to determine that a present value of a second CPL is greater than the integrated value of the second CPLs, and that a present value of a first CPL is less than the integrated value of the first CPLs. The filter subsequently flags that the signals are not useable.

In a different aspect, the processor is configured to determine integrated values of first CPLs and second CPLs, based on a predetermined number of received returned online, first offline and second offline signals. The filter is configured to determine that a present value of a first CPL is greater than the integrated value of the first CPLs, and that a present value of a second CPL is less than the integrated value of the second CPLs. The filter subsequently flags that the signals are not useable.

The returned online signal is set to an absorption wavelength of a species of gas. The returned first offline signal is set to a first non-absorption wavelength of the species of gas. The returned second offline signal is also set to the same non-absorption wavelength of the species of gas.

The transmitted online, first offline and second offline signals form a train of pulse triplets that are repeated at a predetermined pulse repetition frequency (PRF). The returned online, first offline and second offline signals form a similar train of pulse triplets.

Each pulse triplet includes three pulses spaced apart at approximately 100 nanoseconds or less from each other. Each pulse triplet includes a pulse width of approximately 15-20 nanoseconds, and each pulse triplet includes the predetermined PRF of approximately 1 KHz.

The processor is configured to determine integrated values of first and second returned offline signals, based on a predetermined number of received first and second offline signals. The filter is configured to determine that a present value of a second returned offline signal is greater than the integrated value of second returned offline signals. The filter is subsequently configured to flag that the signals are not useable.

In another aspect, the processor is configured to determine integrated values of first and second returned offline signals, based on a predetermined number of received first and second offline signals. The filter is configured to determine that a present value of a first returned offline signal is greater than the integrated value of first returned offline signals. The filter is subsequently configured to flag that the signals are not useable.

Another embodiment of the present invention is a remote sensing system including a differential absorption lidar (DIAL) system for transmitting and receiving optical signals to and from a target. The optical signals include (a) an online signal having an absorption wavelength of a species of gas, (b) a first offline signal having a non-absorption wavelength of the species of gas, and (c) a second offline signal having the same non-absorption wavelength of the species of gas. The DIAL system determines a first concentration path length (CPL) based on a first ratio between signals (a) and (b), and determines a second CPL based on a second ratio between signals (a) and (c). A filter correlates the first CPL with the second CPL in order to assess quality of the optical signals.

The filter is configured to:

(a) compare a presently determined first CPL value with a first integrated value of a number of first CPLs, and (b) compare a presently determined second CPL value with a second integrated value of a number of second CPLs, and (c) provide a flag denoting that the presently determined first CPL or second CPL is useable, or not useable, depending on the comparison in (a) or (b).

The filter is also configured to:

(a) compare a presently received first offline signal with a first integrated value of a number of first offline signals, and (b) compare a presently received second offline signal with a second integrated value of a number of second offline signals, and (c) provide a flag denoting that a presently determined first CPL or second CPL is useable, or not useable, depending on the comparison in (a) or (b).

The online, first offline and second offline pulse trains are interleaved to form pulse triplets having the same predetermined pulse repetition frequency.

Yet another embodiment of the present invention is a method of sensing a species of gas comprising the steps of:

(a) receiving (i) an online signal having an absorption wavelength of a species of gas, (ii) a first offline signal having a non-absorption wavelength of the species of gas, and (iii) a second offline signal having the same non-absorption wavelength of the species of gas;

(b) determining a first concentration path length (CPL) based on a first ratio between signals (i) and (ii), and determining a second CPL based on a second ratio between signals (i) and (iii); and (c) correlating the first CPL with the second CPL in order to assess quality of the optical signals.

The step of receiving includes:

receiving the online signal as an online pulse train having a predetermined pulse repetition frequency (PRF), receiving the first offline signal as a first pulse train having the same predetermined pulse repetition frequency, and receiving the second offline signal as a second pulse train having the same predetermined pulse repetition frequency;

wherein the online, first offline and second offline pulse trains are interleaved to form pulse triplets having the same predetermined pulse repetition frequency.

The step of correlating includes:

comparing a presently determined first CPL with a previously determined number of first CPLs, and comparing a presently determined second CPL with a previously determined number of second CPLs.

The step of correlating also includes:

comparing a presently received first offline signal with a previously determined number of first offline signals, and comparing a presently determined second offline signal with a previously determined number of second offline signals.

Still another embodiment of the present invention is a remote sensing system including:

a transmitter for transmitting a pulse triplet toward a target, in which at least one pulse is a first online signal, at least another pulse is a first offline signal, and a further pulse is either a second online signal or a second offline signal, a receiver for receiving the pulse triplet from the target, a processor for determining (a) a first ratio based on the returned first online signal and first offline signal, and (b) a second ratio based on either (i) the returned second online signal and first offline signal, or (ii) the returned first online signal and the second offline signal, and a filter for correlating the first ratio with the second ratio for determining whether the received pulse triplet is useable.

The first and second ratios, respectively, form first and second CPLs. The processor is configured to determine integrated values of first CPLs and second CPLs, based on a predetermined number of received pulse triplets. The filter is configured to determine that a present value of a second CPL is greater than the integrated value of the second CPLs, and that a present value of a first CPL is less than the integrated value of the first CPLs. The filter is subsequently configured to flag that the pulse triplet is not useable.

In another aspect, the processor is configured to determine integrated values of first CPLs and second CPLs, based on a predetermined number of received pulse triplets. The filter is configured to determine that a present value of a first CPL is greater than the integrated value of the first CPLs, and that a present value of a second CPL is less than the integrated value of the second CPLs. The filter is subsequently configured to flag that the pulse triplet is not useable.

The first offline signal and second offline signal have wavelengths that are similar to each other; and the first online signal and second online signal have wavelengths that are different or similar to each other.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures.

DETAILED DESCRIPTION OF THE INVENTION

The present invention detects trace gases in the atmosphere by sampling a column of air at a specific point above the earth, using a remote sensing system which is disposed in an aircraft or an orbiting satellite.

One aspect of the present invention is to utilize an airborne platform-based 3-line tunable differential absorption lidar (DIAL) laser optical sensor for remote quantitative detection of leaks from a natural gas, or oil pipeline. The gases released into the atmosphere from both gas and oil pipeline leaks are elevated and methane, for example, is selected for detection. The methane absorption characteristics are analyzed by transmitting two offline wavelengths and one online wavelength. The online wavelength is selected close to the peak of the target gas optical absorption with minimum interference from other gases. The offline wavelengths are selected near the wing of the target gas optical absorption, with minimum interference from other gases.

Another aspect of the present invention includes a remote sensing system have a downward looking mid-wave infrared (MWIR) based DIAL sensor tuned for methane and integrated on a Cessna Caravan aircraft. The primary operations for this system are the detection of natural gas anomalies (to be referred to as leak indications) above natural gas distribution pipelines or explorations areas. The system is configured for maximizing linear coverage rate, while having a cross-track sample width large enough to find a wide size-range of natural gas plumes associated with pipeline leaks, or naturally occurring seeps.

Figure 6:
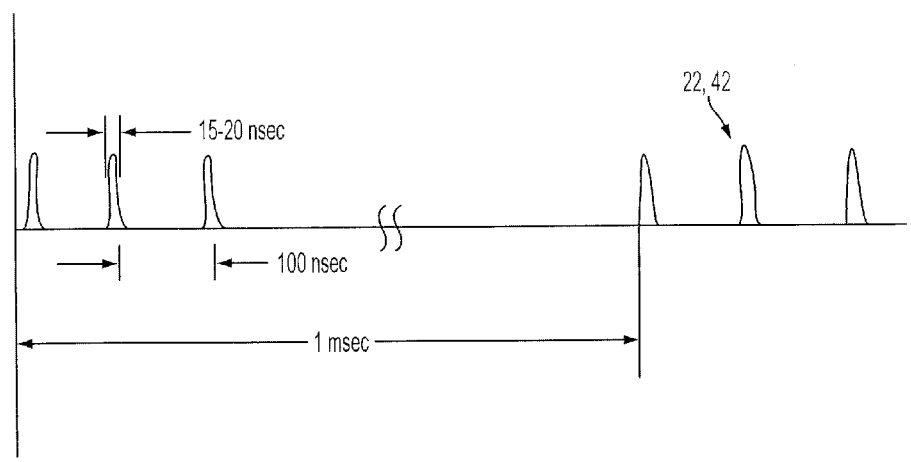
FIG. 6 is an illustration showing the transmitted or received laser pulse triplets, in accordance with an embodiment of the present invention.

To accomplish this the aircraft flies along an intended target line, while the DIAL sensor cross-track surveys approximately +2S−50 feet using a conical scanner to spread out 1 KHz pulsed laser triplet samples. The DIAL sensor uses three pulsed lasers instead of the conventional two lasers. The three lasers each produce a 15 to 20 nanosecond pulse that is separated temporally by 100 nanoseconds (for example) from one another, at a pulse repetition frequency of approximately 1 KHz (for example). An exemplary pulse triplet provided by the sensor system is shown in FIG. 6. The three laser pulses (to be referred to as a pulse triplet) include an online laser wavelength pulse which is designed to be absorbed by a principle chemical species of interest, and two offline laser pulses which are designed to be not absorbed by the chemical species of interest. The pulse triplet is spatially combined in a manner that allows the pulses to travel through the same column of air and approximately reflect off the same target.

By measuring the transmitted and returned energy of these pulses one may make two measurements of concentration path length (CPL) for a single column of air; (a) one measurement for the online laser and the first offline laser, and (b) another measurement for the same online laser and the other offline laser. These two measurements are applied to a data processing filter and a correlation between the two measurements is performed. If the correlation is good, then an average CPL for the two measurements is used. If the correlation is poor, however, the measurement is not used.

As will further be explained, the correlation provides knowledge of quality for each pulse triplet, and results in three advantages. First, if the two measurements of the CPLs for a single column of air are correlated, the average CPL value becomes an excellent relative measurement of the CPL above the background CPL. Thus, multiple samples of the same column of air are not required to obtain a good measurement. Second, if the two measurements show no correlation, it indicates that there is an issue with the DIAL sensor, such as laser alignment (for example). Ultimately, these two advantages lead to a third advantage, which is that area survey work may be accomplished in a rapid manner without missing a leak indication or reporting a false positive leak indication. When the DIAL sensor health is good, greater than 90 to 95% of the pulse triplets are determined to be useable by the correlation filter.

Figure 1:
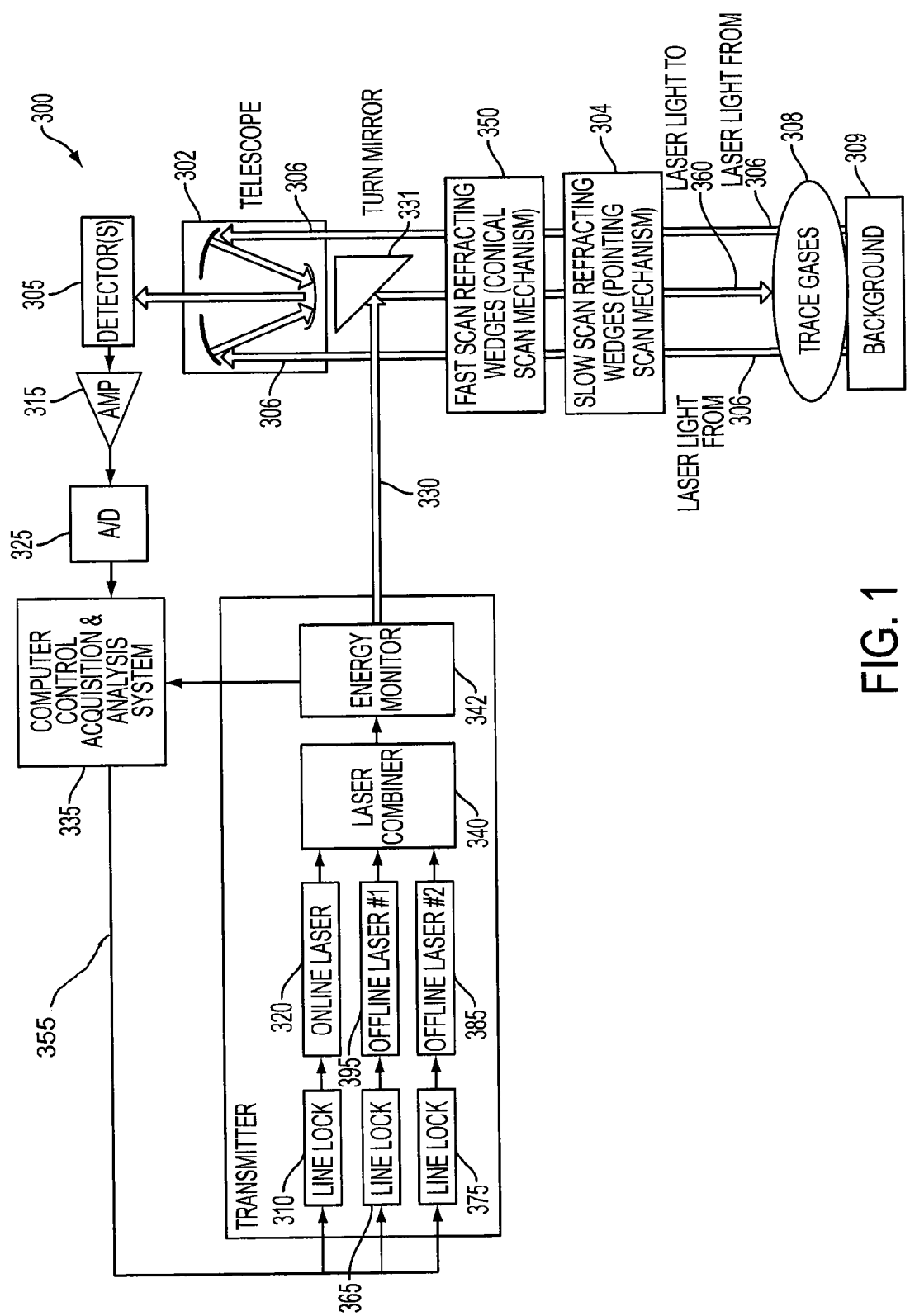
FIG. 1 is a block diagram of a remote sensing system including an online, first offline and second offline laser sources, in accordance with an embodiment of the present invention.

Referring first to FIG. 1, there is shown, as an example, a simplified system block diagram of the present invention. As shown, a remote sensing system, generally designated as 300, includes a 3-line tunable DIAL laser optical sensor system. One online laser (320), one offline laser 1 (395) and another offline laser 2 (385) are locked by electronic control signals 355 onto three different wavelengths by line lock amplifiers 310, 365 and 375, respectively. The online wavelength is selected close to the peak of a target gas' optical absorption characteristics and the two offline wavelengths are selected near the wing of the target gas' optical absorption wavelength. The two offline wavelengths are typically the same, but may be different from each other and, if different, may be selected to be on opposite sides of the online wavelength.

The one online and two offline laser beams are combined by combiner 340 to form combined laser beam 330. An energy monitor 342 measures the amount of energy transmitted as combined laser beam 330. It will be appreciated, however, that energy monitor 342 measures separately the energy in each laser beam, namely the online and two offline laser beams separately. The combined laser beam 330 is reflected off turn mirror 331 and directed by fast scan mirror 350 and slow scan mirror 304 to form laser beam 360. For the region of interest, trace gases in the atmosphere near the ground are sequentially scanned by laser beam 360. Laser beam 360 is scattered and transmitted by trace gas 308, reflected by background 309, and scattered and transmitted again by trace gas 308, forming returned light 306. The returned light 306 is reflected by slow scan mirror 304 and fast scan mirror 350, then transmitted through turn scan mirror 331 and directed into telescope 302. The returned light 306 may pass through a set of filters (not shown), which only pass, respectively, the two offline and one online wavelengths. It will be appreciated that the filters are not necessary, because the pulses are temporally spaced apart from each other. If, however, the three pulses are temporally coincident, then a set of filters may be used to separate the pulses.

A set of detectors 305 converts the returned light into an analog signal. The analog signal is electrically amplified by amplifiers 315, and converted into a digital signal by a set of analog-to-digital (A2SD) converters 325. The digitized signal is processed and analyzed by computer system 335, and the received energies in each of the three wavelengths of light are determined.

The computer system 335 also receives inputs from energy monitor 342 and obtains the respective energy transmitted by each laser source. As part of a feedback loop, the computer system 335 provides tuning control to each line lock module when selecting the correct optical transmit wavelengths. Having determined the three transmit energies and the three receive energies of the three optical signals, respectively, the computer system computes two ratios between the one online and each of the two offline returned signals. The two computed ratios are directly proportional to the target gases' concentration path-lengths (CPLs).

Briefly, the energy which is reflected back to the sensor may be described by the following relationship:

$$E \sim \frac{E_T \rho_\pi \exp[-2(CPL + CbgR)\sigma(\lambda)]}{R^2}, \quad (1)$$

where $E_T$ is the transmitted energy, $\rho_\pi$ is the surface reflectance, CPL is the concentration-length product of the plume, Cbg is the background concentration of the gas, R is the range to the surface, and $\sigma(\lambda)$ is the absorption cross-section of the gas as a function of wavelength.

The transmitted energy, $E_T$, may be assumed to be constant from pulse-to-pulse (since any changes may be measured and accounted for). It may be assumed that $\rho_\pi$ is 0.005 and does not depend upon wavelength for the small range of wavelengths considered, that R is nominally 500 m, and that the cross-section $\sigma(\lambda)$ does not change significantly due to pressure and temperature changes along the path.

The term which is wavelength dependent in Equation (1) is the cross-section, $\sigma(\lambda)$. Many of the terms which do not change may be cancelled by measuring at two wavelengths (one online and one offline) and dividing the results. Let $E_1$ denote the energy measurement at one wavelength, and $E_2$ denote the measurement at a second wavelength. The result may be expressed as follows:

$$\frac{E_1}{E_2} = \frac{\exp[-2(CPL + CbgR)\sigma(\lambda_1)]}{\exp[-2(CPL + CbgR)\sigma(\lambda_2)]}. \quad (2)$$

Taking the natural logarithm of the above, results in the following:

$$\frac{1}{2}\log\left(\frac{E_1}{E_2}\right) = (CPL + CbgR)(\sigma(\lambda_2) - \sigma(\lambda_1)). \quad (3)$$

The cross-section may be measured off line or in real time (using a gas cell onboard the aircraft). In either case, the cross-section at each wavelength becomes a known value. Therefore, the result becomes:

$$\frac{1}{2(\sigma(\lambda_2) - \sigma(\lambda_1))}\log\left(\frac{E_1}{E_2}\right) = (CPL + CbgR). \quad (4)$$

Equation 4 is a possible measurement process. However, there are additional processing possibilities, since R may also be measured by the system and Cbg may be estimated or measured. It is then possible to produce an estimate of the CPL.

Figure 2:
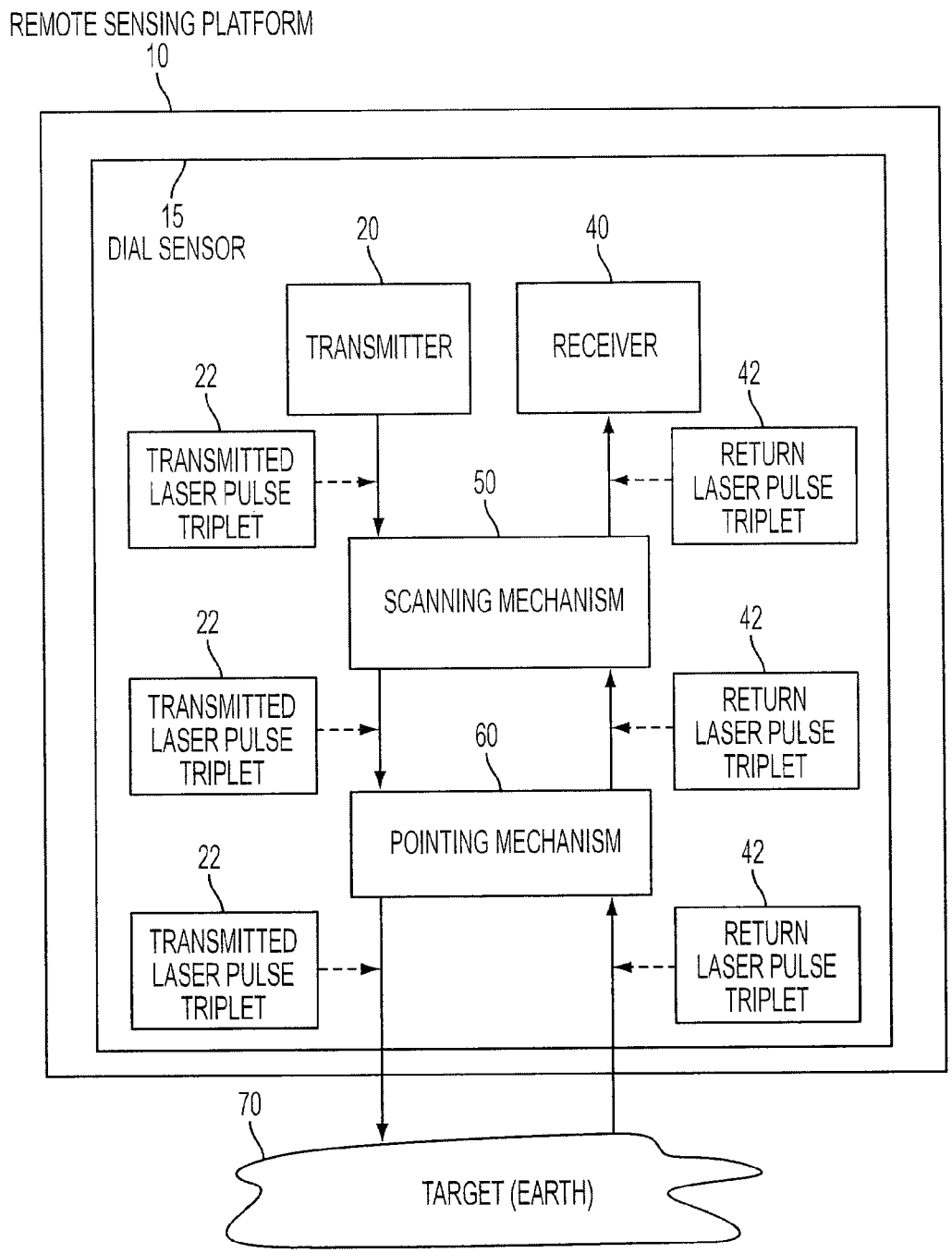
FIG. 2 is a functional block diagram of the remote sensing system shown in FIG. 1 including transmitted and received laser pulse triplets, in accordance with an embodiment of the present invention.

Referring next to FIG. 2, there is shown a simplified block diagram for performing a remote sensing DIAL operation, in accordance with another embodiment of the present invention. As shown, a remote sensing platform 10 is integrated with a DIAL sensor 15. The DIAL sensor 15 includes transmitter 20, receiver 40, scanning mechanism 50, and pointing mechanism 60. The transmitter 20 produces a laser pulse train that is referred to herein as a transmitted laser pulse triplet 22. After passing through a column of air, striking target 70, such as the Earth, the signal is returned back to remote sensing platform 10. On the return path, the signal is referred to herein as a returned laser pulse triplet 42, where the signal is collected by receiver 40.

In the embodiment shown in FIG. 2, the transmitted pulse triplet may be different from the transmitted pulse triplet formed by system 300 of FIG. 1. The transmitted pulse triplet produced by system 300 includes one online pulse and two offline pulses. In DIAL sensor 15 of FIG. 2, however, transmitted pulse triplet 22 may include a first online pulse, and a second offline pulse and a third pulse, which may be either an offline pulse (similar to the pulse produced by system 300) or an online pulse. It will be appreciated that if the third pulse is another online pulse, the third pulse may have a wavelength that is identical to or different from the other online pulse (for example, the first and third pulses in the pulse triplet may have identical or different wavelengths).

Accordingly, the following combination of pulse triplets may be formed by DIAL sensor 15:

| 1st pulse | 2nd pulse | 3rd pulse |
|---|---|---|
| online | offline | offline |
| online | online | offline |

The order of the pulses may be different from the order shown above. For example, the first pulse may be an offline pulse and the next two pulses may be online pulses.

The two offline pulses in one pulse triplet are typically of the same wavelength, but the two online pulses in the other pulse triplet may be of an identical wavelength or of a different wavelength.

Figure 3:
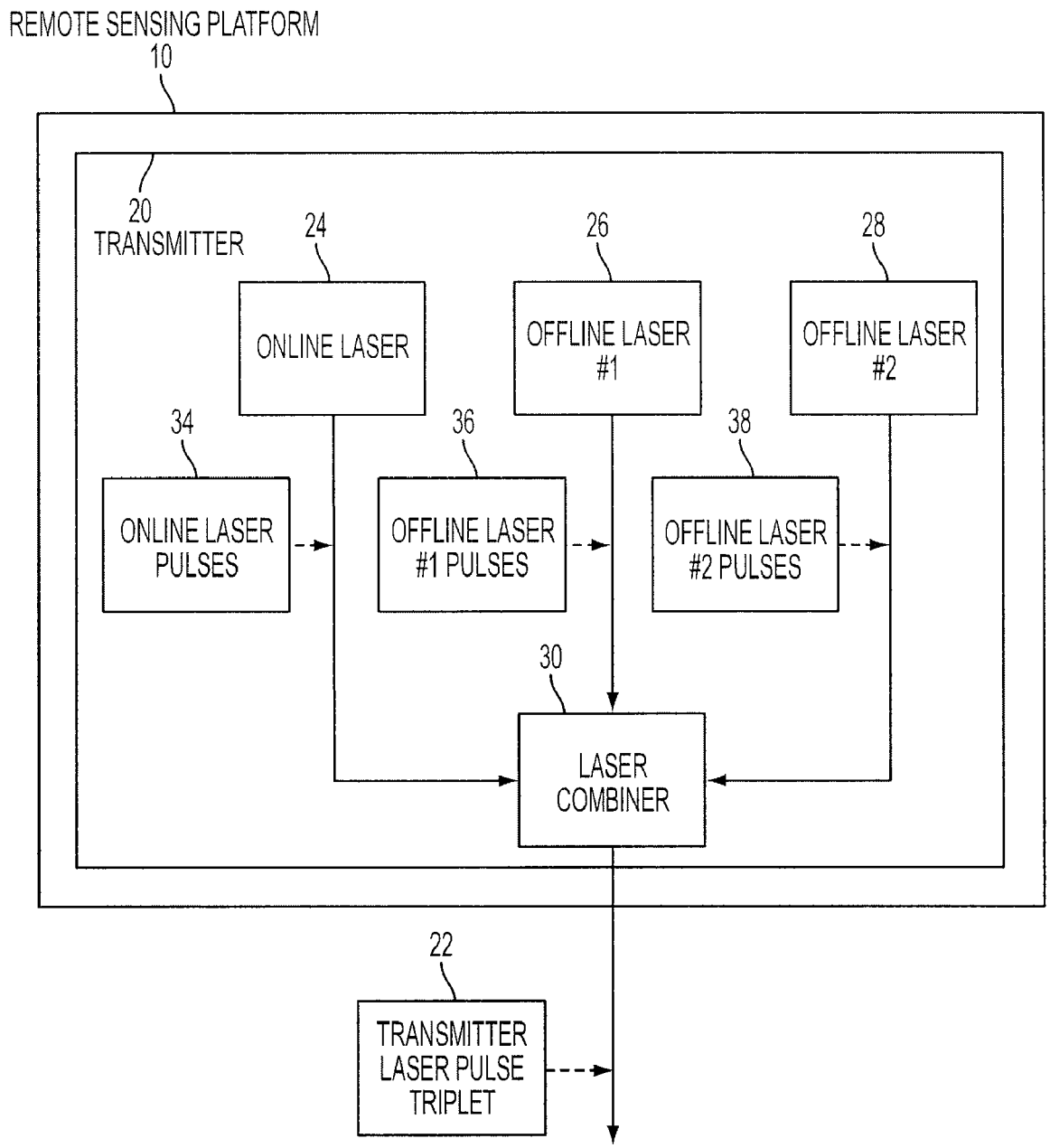
FIG. 3 is a functional block diagram depicting generation of the transmitted laser pulse triplets, in accordance with an embodiment of the present invention.

FIG. 3 illustrates that the transmitted laser pulse triplet 22 is formed by three laser sources, namely, online laser 24, offline laser #1 (26), and offline laser #2 (28), respectively. Each laser produces an individual train of laser pulses, namely, online laser pulses 34, offline laser #1 pulses 36, and offline laser #2 pulses 38, which are spatially combined by laser combiner 30. Although not shown, it will be understood that transmitter system 20 also includes an energy monitor, such as energy monitor 342 shown in FIG. 1, for determining the energy levels transmitted by each laser source.

Figure 4:
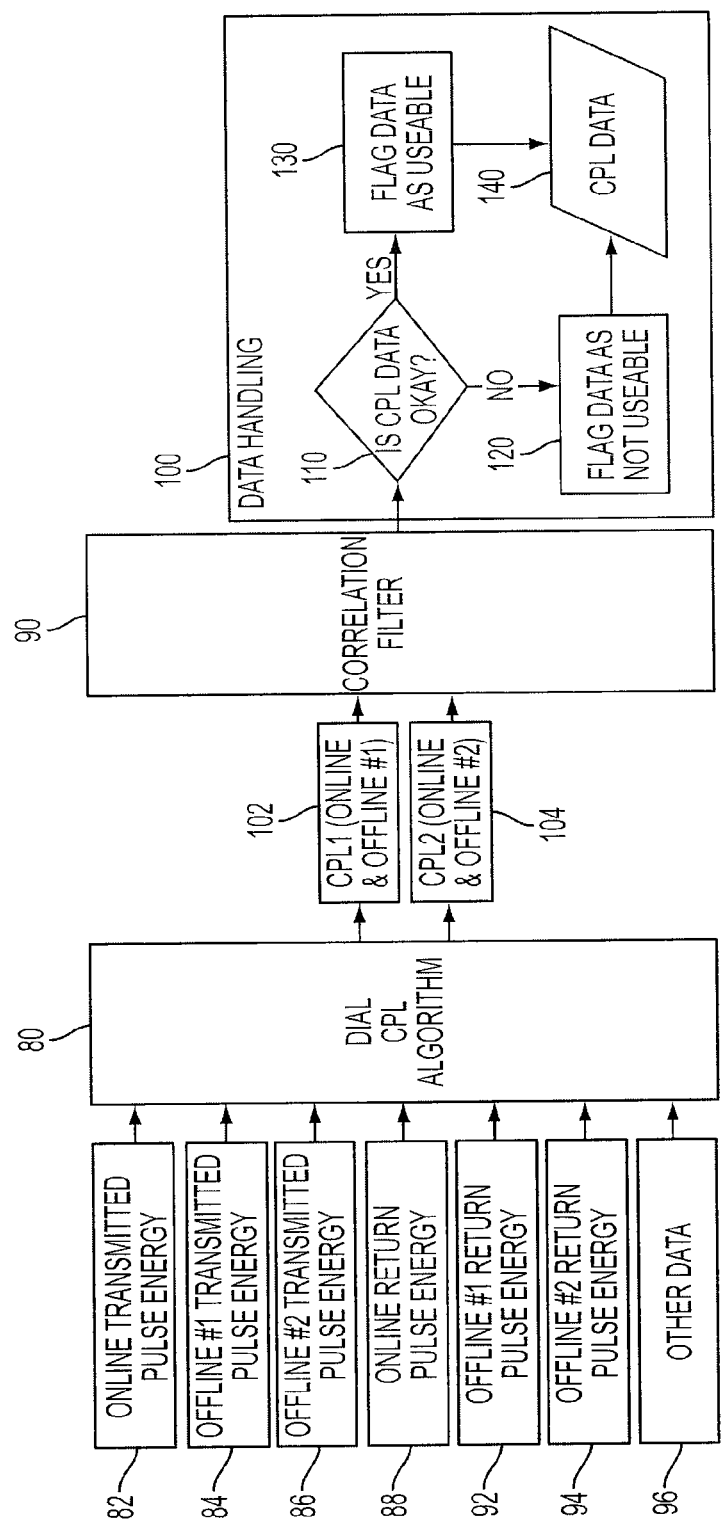
FIG. 4 is a block diagram depicting inputted and outputted signals of a DIAL CPL algorithm and a correlation filter, in accordance with an embodiment of the present invention.

Measurement of the energies of transmitted laser pulse triplet 22 and returned laser pulse triplet 42 produces data that allows the concentration path length (CPL) of a column of air between DIAL sensor 15 and target 70 (Earth) to be determined. The measurement process is illustrated in FIG. 4. As shown, the individual transmitted and returned pulses are identified as an online transmitted pulse energy 82, an offline #1 transmitted pulse energy 84, an offline #2 transmitted pulse energy 86, an online returned pulse energy 88, an offline #1 returned pulse energy 92, and an offline #2 returned pulse energy 94. The pulse data, in addition to other data 96 (for example, navigation data based on GPS) are processed by a DIAL CPL algorithm 80, which produces (a) one CPL measurement based on the online laser 24 and offline laser #1 (26), thereby forming CPL1 (102); and (b) another CPL measurement based on online laser 24 and offline laser #2 (28), thereby forming CPL2 (104).

The CPL measurements are then processed by another algorithm, shown as correlation filter 90, which determines whether the two CPL values (CPL1 and CPL2) correlate sufficiently to be useable for data analysis. A data handler, generally designated as 100, as shown, uses conditional process block 110, which may branch to another block to produce not usable flag 120, or branch to yet another block to produce usable flag 130. Finally, data storage 140 may be used to store the results of the process.

Figure 5:
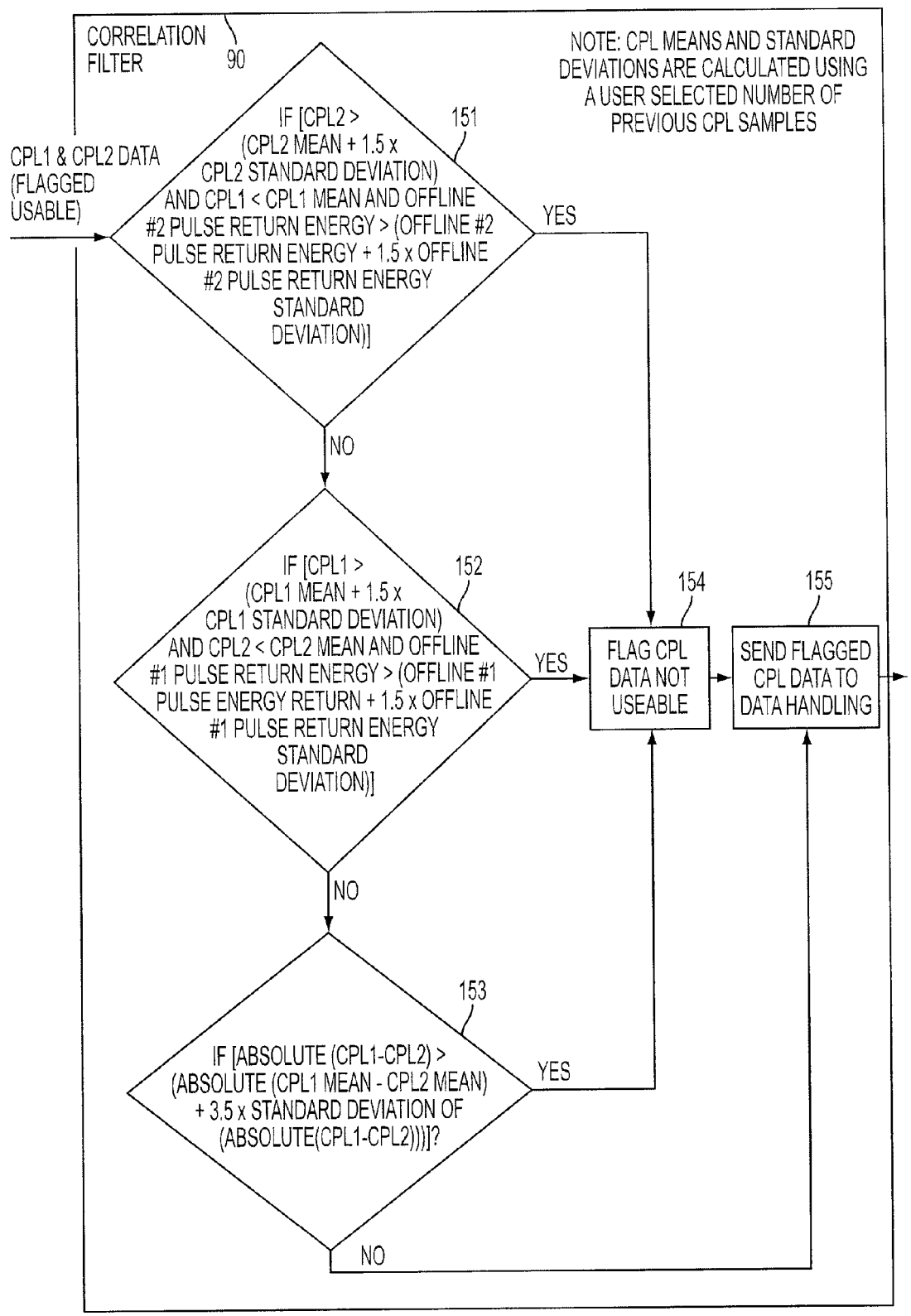
FIG. 5 is a flow diagram showing steps performed by the correlation filter of FIG. 4, in accordance with an embodiment of the present invention.

Referring now to FIG. 5, the steps performed by correlation filter 90 is shown as an example of the present invention. The correlation filter receives the presently determined first CPL (CPL1, 102) and the second CPL (CPL2, 104) from the CPL algorithm unit 80. The first and second CPLs are assumed, at first instance, to be useable and are flagged as such.

In addition, the system computes the mean and the standard deviation values of a predetermined number of first CPLs and second CPLs. The system also computes the mean and the standard deviation values of the energies in a predetermined number of returned pulses of the first offline signal (offline1) and the second offline signal (offline2). The predetermined number of first and second CPLs may be user adjustable and the predetermined number of returned pulses of the first offline signal and the second offline signal may also be user adjustable. It will be appreciated that these computations may be executed in the computer control, acquisition and analysis system shown in FIG. 1 as element 335. the CPL algorithm and the correlation filter algorithm may also reside and be executed by computer 335.

Having computed the mean and standard deviation of a number of CPL1s, the mean and standard deviation of a number of CPL2s, the mean and standard deviation of the energy in a number of the first returned offline signals (offline1), and the mean and standard deviation of the energy in a number of the second returned offline signals (offline2), the correlation filter is ready to perform the following comparisons and decisions:

Decision block 151 determines:
(a) if CPL2>CPL2 mean+1.5×CPL2 standard deviation AND
(b) if CPL1<CPL1 mean AND
(c) offline2 pulse return energy>offline2 pulse return energy+1.5×offline2 pulse return energy standard deviation?

If yes, then the CPL data is flagged not useable by step 154.
If no, then decision block 152 is entered.
Decision block 152 determines:
(a) if CPL1>CPL1 mean+1.5×CPL1 standard deviation AND
(b) if CPL2<CPL2 mean AND
(c) offline1 pulse return energy>offline1 pulse return energy+1.5×offline1 pulse return energy standard deviation?

If yes, then the CPL data is flagged not useable by step 154.
If no, then decision block 153 is entered.
Decision block 153 determines:
(a) if the absolute value of (CPL1−CPL2)>absolute value of (CPL1 mean−CPL2 mean)+3.5×standard deviation of (CPL1−CPL2)?

If yes, then the CPL data is flagged not useable by step 154.
If no, then the CPL data is flagged useable by step 155 and the data is forwarded to the data handling unit 100.

The present invention may be used in any active remote sensing system that utilizes an on-board light source such as a laser. Although three laser sources have been shown in FIG. 1, it will be understood that, by proper wavelength tuning, only one or two laser sources need be used to form the three desired laser wavelengths.

It will be appreciated that FIGS. 4 and 5 show an embodiment of the present invention in which CPL1 (online and offline #1) and CPL2 (online and offline #2) are correlated by correlation filter 90. However, in the other embodiment described with respect to DIAL sensor 15 of FIG. 2, the present invention contemplates that a pulse triplet may include two online pulses and one offline pulse. Accordingly, CPL1 may be a ratio formed by an online #1 pulse and the offline pulse, whereas CPL2 may be a ratio formed by an online #2 pulse and the same offline pulse. The process shown for these CPL1 and CPL2 ratios are the same as the process shown in FIG. 5.

The DIAL target may range from natural to man-made chemical species including methane, ethane, carbon dioxide, propane, etc. The remote sensing system may be on a moving platform, such as a fixed-wing aircraft, helicopter, UAV, balloon, automobile, truck, or a fixed platform, such as a building or tower. Hand-held units are also a possibility.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A remote sensing system comprising:
a transmitter that transmits an online signal and first and second offline signals toward a target,
a receiver that receives a returned online signal and first and second returned offline signals from the target,
a processor configured to determine (a) a first CPL (concentration path length) value based on the returned online signal and only the first offline signal, and (b) a second CPL value based on the returned online signal and only the second offline signal, and
the processor configured to determine a first CPL mean and a first CPL standard deviation, based on a predetermined number of first CPL values,
the processor configured to determine a second CPL mean and a second CPL standard deviation, based on a predetermined number of second CPL values,
a filter that correlates the first CPL value and the second CPL value with (a) the first CPL mean and the first CPL standard deviation and (b) the second CPL mean and the second CPL standard deviation, respectively, for determining whether the first and second CPL values are useable.

2. The remote sensing system of claim 1 wherein
the processor is configured to determine the first CPL value and the second CPL value, based on a predetermined number of received returned online, first offline and second offline signals,
the processor is configured to determine a first energy value and a first energy standard deviation, based on a predetermined number of returned first offline signals;
the processor is configured to determine a second energy value and a second energy standard deviation, based on a predetermined number of returned second offline signals,
the filter is configured to determine if the following inequality is true:

IF [CPL1>(CPL1MEAN+1.5×CPL1SD) AND CPL2<CPL2MEAN AND ENERGY1>(ENERGY1+1.5×ENERGYSD1]

wherein
CPL1 is the first CPL value,
CPL2 is the second CPL value,
CPL1MEAN is the first CPL mean,
CPL2MEAN is the second CPL mean,
CPL1SD is the first CPL standard deviation,
ENERGY1 is the first energy value,
ENERGYSD1 is the first energy standard deviation,
and
the filter is subsequently configured to flag that the signals are not useable.

3. The remote sensing system of claim 1 wherein
the processor is configured to determine the first CPL value and the second CPL value, based on a predetermined number of received returned online, first offline and second offline signals,
the processor is configured to determine a first energy value and a first energy standard deviation, based on a predetermined number of returned first offline signals;
the processor is configured to determine a second energy value and a second energy standard deviation, based on a predetermined number of returned second offline signals, the filter is configured to determine if the following inequality is true:

IF [CPL2>(CPL2MEAN+1.5×CPL2SD) AND
CPL1<CPL1MEAN AND ENERGY2>
(ENERGY2+1.5×ENERGYSD2)]

wherein
CPL1 is the first CPL value,
CPL2 is the second CPL value,
CPL1MEAN is the first CPL mean,
CPL2MEAN is the second CPL mean,
CPL2SD is the second CPL standard deviation,
ENERGY2 is the second energy value,
ENERGYSD2 is the second energy standard deviation
and
the filter is subsequently configured to flag that the signals are not useable.

4. The remote sensing system of claim 1 wherein
the processor is configured to determine the first CPL value and the second CPL value, based on a predetermined number of received returned online, first offline and second offline signals,
the filter is configured to determine if the following inequality is true:

IF [ABSOLUTE(CPL1−CPL2)>(ABSOLUTE
(CPL1MEAN−CLPL2MEAN)+3.5×
STANDARD DEVIATION OF (ABSOLUTE
(CPL1−CPL2)))]

wherein
CPL1 is the first CPL value,
CPL2 is the second CPL value,
CPL1MEAN is the first CPL mean,
CPL2MEAN is the second CPL mean,
and
the filter is subsequently configured to flag that the signals are not useable.

5. The remote sensing system of claim 1 wherein
the returned online signal is set to an absorption wavelength of a species of gas,
the returned first offline signal is set to a non-absorption wavelength of the species of gas, and
the returned second offline signal is set to a non-absorption wavelength of the species of gas.

6. The remote sensing system of claim 1 wherein
the transmitted online, first offline and second offline signals form a train of pulse triplets that are repeated at a predetermined pulse repetition frequency (PRF), and
the returned online, first offline and second offline signals form another train of pulse triplets.

7. The remote sensing system of claim 5 wherein
the first offline wavelength and second offline wavelength are the same.

8. The remote sensing system of claim 6 wherein
each pulse triplet includes three pulses spaced apart at approximately 100 nanoseconds or less from each other,
each pulse triplet includes a pulse width of approximately 15-20 nanoseconds, and
each pulse triplet includes the predetermined PRF of approximately 1 KHz.

9. A remote sensing system comprising:
a differential absorption lidar (DIAL) system that transmits and receives optical signals to and from a target,
the optical signals including (a) an online signal having an absorption wavelength of a species of gas, (b) a first offline signal having a non-absorption wavelength of the species of gas, and (c) a second offline signal having a non-absorption wavelength of the species of gas,
the DIAL system determining a first concentration path length (CPL) value based on signals (a) and only (b), and determining a second CPL value based on signals (a) and only (c), and
the processor configured to determine a first CPL mean and a first CPL standard deviation, based on a predetermined number of first CPL values,
the processor configured to determine a second CPL mean and a second CPL standard deviation, based on a predetermined number of second CPL values,
a filter that correlates the first CPL value and the second CPL value with (a) the first CPL mean and the first CPL standard deviation and (b) the second CPL mean and the second CPL standard deviation, respectively, in order to assess quality of the optical signals.

10. The remote sensing system of claim 9 wherein
the filter is configured to determine if the following inequality is true:

IF [CPL1>(CPL1MEAN+1.5×CPL1SD) AND
CPL2<CPL2MEAN AND ENERGY1>
(ENERGY1+1.5×ENERGYSD1]

wherein
CPL1 is the first CPL value,
CPL2 is the second CPL value,
CPL1MEAN is the first CPL mean,
CPL2MEAN is the second CPL mean,
CPL1SD is the first CPL standard deviation,
ENERGY1 is the first energy value,
ENERGYSD1 is the first enemy standard deviation,
provide a flag denoting that the first CPL value is not useable.

11. The remote sensing system of claim 9 wherein
the processor is configured to determine a first energy value and a first energy standard deviation, based on a predetermined number of returned first offline signals;
the processor is configured to determine a second energy value and a second energy standard deviation, based on a predetermined number of returned second offline signals,
the filter is configured to determine if the following inequality is true:

IF [CPL2>(CPL2MEAN+1.5×CPL2SD) AND
CPL1<CPL1MEAN AND ENERGY2>
(ENERGY2+1.5×ENERGYSD2)]

wherein
CPL1 is the first CPL value,
CPL2 is the second CPL value,
CPL1MEAN is the first CPL mean,
CPL2MEAN is the second CPL mean,
CPL2SD is the second CPL standard deviation,
ENERGY2 is the second energy value,
ENERGYSD2 is the second energy standard deviation
provide a flag denoting that the second CPL value is not useable.

12. The remote sensing system of claim 9 wherein
the online signal includes an online pulse train having a predetermined pulse repetition frequency (PRF),
the first offline signal includes a first pulse train having the same predetermined pulse repetition frequency, and
the second offline signal includes a second pulse train having the same predetermined pulse repetition frequency.

13. The remote sensing system of claim 12 wherein
the online, first offline and second offline pulse trains are interleaved to form pulse triplets having the same predetermined pulse repetition frequency.

* * * * *